US012764403B2

(12) United States Patent
D'Aleo et al.

(10) Patent No.: US 12,764,403 B2
(45) Date of Patent: Oct. 13, 2026

(54) OPTICAL FLOW SENSOR

(71) Applicant: ams-OSRAM Asia Pacific Pte. Ltd., Singapore (SG)

(72) Inventors: Francesco Paolo D'Aleo, Eindhoven (NL); Jens Geiger, Eindhoven (NL); Markus Rossi, Eindhoven (NL)

(73) Assignee: ams-OSRAM Asia Pacific Pte. Ltd., Singapore (SG)

( * ) Notice: Subject to any disclaimer, the term of this patent is extended or adjusted under 35 U.S.C. 154(b) by 162 days.

(21) Appl. No.: 18/292,288

(22) PCT Filed: Jul. 19, 2022

(86) PCT No.: PCT/SG2022/050513
§ 371 (c)(1),
(2) Date: Jan. 25, 2024

(87) PCT Pub. No.: WO2023/009068
PCT Pub. Date: Feb. 2, 2023

(65) Prior Publication Data

US 2024/0430552 A1 Dec. 26, 2024

(30) Foreign Application Priority Data

Jul. 26, 2021 (GB) ..................................... 2110716

(51) Int. Cl.
*H04N 5/335* (2011.01)
*G06V 40/20* (2022.01)
*H04N 23/55* (2023.01)

(52) U.S. Cl.
CPC ............ *H04N 23/55* (2023.01); *G06V 40/20* (2022.01)

(58) Field of Classification Search
CPC ...................................................... H04N 23/55
See application file for complete search history.

(56) References Cited

U.S. PATENT DOCUMENTS 3,936,639 A * 2/1976 Barrett .................... G01T 1/295
250/369
2002/0075990 A1 6/2002 Lanza et al.
(Continued)

FOREIGN PATENT DOCUMENTS

JP 2009250685 A 10/2009
WO 00/59371 A1 10/2000
(Continued)

OTHER PUBLICATIONS

International Search Report issued for International Patent Application No. PCT/SG2022/050513 on Feb. 15, 2023 (4 pages).
(Continued)

*Primary Examiner* — Gary C Vieaux
(74) *Attorney, Agent, or Firm* — Viering, Jentschura & Partner mbB

(57) ABSTRACT

An optical device includes a sensor and a mask structure. The mask structure is configured to provide a first mask covering at least a part of the sensor and a second mask covering at least a part of the sensor. The second mask is the anti-mask of the first mask, and the sensor is configured to provide first output signals for light transmitted through the first mask and second output signals for light transmitted through the second mask.

15 Claims, 11 Drawing Sheets

(56) References Cited

U.S. PATENT DOCUMENTS

| | | | | |
|---|---|---|---|---|
| 2005/0030625 | A1* | 2/2005 | Cattin-Liebl | G01T 1/295 359/560 |
| 2008/0203316 | A1 | 8/2008 | Ziock | |
| 2009/0122958 | A1* | 5/2009 | Mihailescu | G01T 1/1647 250/336.1 |
| 2011/0026141 | A1 | 2/2011 | Barrows | |
| 2011/0168903 | A1 | 7/2011 | Kyele et al. | |
| 2022/0090964 | A1* | 3/2022 | You | G01N 21/65 |

FOREIGN PATENT DOCUMENTS

| | | | | | |
|---|---|---|---|---|---|
| WO | WO-2006061819 | A1 | * | 6/2006 | G01S 3/7835 |
| WO | 2019/116364 | A1 | | 6/2019 | |
| WO | WO-2022045969 | A1 | * | 3/2022 | H04N 23/957 |

OTHER PUBLICATIONS

Written Opinion issued for International Patent Application No. PCT/SG2022/050513 on Feb. 15, 2023 (5 pages).

Japanese office action issued for the corresponding Japanese patent application No. 2024-501865, dated Mar. 4, 2025, 3 pages (for informational purposes only).

* cited by examiner

OPTICAL FLOW SENSOR

CROSS REFERENCE TO RELATED APPLICATION

This application is a National Stage of International Application No. PCT/SG2022/050513, filed on Jul. 19, 2022, which designates the United States and was published in English, and which claims priority to Great Britain Patent Application No. 2110716.4, filed on Jul. 26, 2021, in the Intellectual Property Office. All of the aforementioned applications are hereby incorporated by reference in their entireties.

FIELD OF DISCLOSURE

The present disclosure concerns optical devices such as optical flow sensors for gesture recognition, and methods of optical flow sensing.

BACKGROUND

Optical flow or optic flow is the pattern of apparent motion of objects caused by the relative motion between an observer/sensor and a scene. Optical flow can also be defined as the distribution of apparent velocities of movement of brightness patterns in a sequence of images.

Optical flow is obtained by analysing image sequences. In lens-less systems there is an intermediate phase, because acquired images do not represent directly the observed scene, and require a reconstruction stage. The reconstruction algorithms may require significant computational power, which translates to lagged sensing.

In the field of gesture recognition with bidirectional displays, it is important to discern the movement of an observed object (e.g. fingers) but not the object itself. In order to have a flat device, which does not disturb the displayed information, mask patterns may be used. The optical mask then encodes the projected image onto the sensor plane.

In order to retrieve the movement of an object from the projected pattern, analysis of the image sequence is required, wherein the images depend on the specific pattern. A problem with this approach is that the reconstruction depends on the object irradiance variation and on the specific mask, which can complicate the extraction/determination of the movement.

SUMMARY

To solve this problem the present disclosure proposes a solution based on patterned apertures, which can provide direct object movement reconstruction, without requiring a separate step of image reconstruction and independent of the optical mask used to provide the pattern.

To solve this further problem, it is proposed to use two optical masks, wherein one mask is the anti-mask mask of the other. The anti-mask is also referred to as the "complementary mask" herein. These masks are complementary in that transparent (or non-zero intensity) regions of one mask correspond to opaque (or zero intensity) regions of the second mask. The mask pattern is typically transparent to visible light, while blocking infrared (IR) radiation. For a binary mask A, the anti-mask is $A'=(1-A)$. This allows the dependency from the mask to be cancelled out and direct information of the object movement to be obtained.

According to a first aspect of the present disclosure there is provided an optical device comprising a sensor and a mask structure. The mask structure is configured to provide a first mask covering at least a part of the sensor and a second mask covering at least a part of the sensor (may be the same or a different part from that covered by the first mask). The second mask is the anti-mask of the first mask, and the sensor is configured to provide first output signals for light (e.g. infrared light) transmitted through the first mask and second output signals for light transmitted through the second mask.

The optical device can hence be used to capture a sequence of images projected onto the sensor by the first mask, and a second sequence of images projected onto the sensor by the second mask, and to use these two image sequences to determine the velocity and/or trajectory of an object moving in front of the sensor. No image reconstruction is required. By summing the time derivatives of the two sequences, an image is obtained (referred to as the "box blurred image" herein) from which the movement of the object can be deduced without requiring knowledge of the specific mask structure.

The complementary masks can be alternately projected (temporally separated) or spatially separated to allow independent photodetector measurements. In the letter case, a delay line memory may be used to match the subtraction of measurements from the same image cells.

In one embodiment, the first mask covers substantially a first half of an area of the sensor and the second mask covers substantially a second half of the area. Preferably, when the sensor has a shorter dimension, the area is split along this shorter dimension.

Typically, each of the first and second masks is a binary mask. That is the masks comprise patterns having features which are substantially transparent and features which are substantially opaque to light having a wavelength within a target range (e.g. IR light). Alternatively a gradient mask can be used. Individual mask features (typically squares) may have a size in the range of 16 μm to 48 μm, depending on the target wavelength and application. For example, for infrared light having a wavelength of 850 nm, squares having a width of about 32 μm may be used. The first mask may comprise a checkerboard pattern comprising a plurality of squares. The second mask may comprise the same checkerboard pattern but shifted vertically or horizontally relative to the sensor by an odd number of squares. For example, the second mask may be shifted by a single row or column of the checkerboard pattern relative to the first, so that the first and second masks cover almost the same parts of the underlying sensor area.

Each of the first and second masks may comprise a uniformly redundant array, URA, pattern. Using URA patterns can also allow an image of the object to be reconstructed from the sensor output. Alternatively, the first mask may comprise a random or pseudo-random pattern. This can be advantageous for covering an arbitrary device shape. Also the image filter required for reconstructing an image of the object is the same as the first mask.

The first and second masks may comprise a patterned polymer layer, which blocks at least light having a wavelength in the range of 900 nm to 1200 nm. The polymer layer may block further light having wavelengths outside the range. Preferably, the polymer layer is transparent to visible light. The polymer layer may be patterned by lithography. A mask structure comprising a polymer layer may be advantageous compared to a mask based on alternating high and low refractive indices because they are dependent on the optical path and therefore on the incidence angle. A polymer layer mask may also be relatively cheaper, thinner and easier to design.

The mask structure can be reconfigurable in order to change the first and second masks depending on an application of the optical device. The mask structure may comprise a switching unit to switch between complementary masks. The mask structure may comprise and adjustable mask such as a liquid crystal display, LCD. The first and second masks are then provided by activating or deactivating cells of the LCD, such that the first and second masks are temporally separated. In this way, no parallax may occur, but the temporal resolution is reduced by half.

Alternatively, the mask structure may comprise a layer of transistors. For example, transistors based on vanadium dioxide can be configured to block infrared radiation in a controlled manner while allowing the visible radiation to pass through. They can be organized on flat surfaces forming a grid, which can be modulated to create a mask pattern. Different types of coded apertures may be generated, and mask-anti-mask pairs may be generated subsequently, with no mask displacement and a dynamic adaptation of the mask related to the application (e.g. scene or movement reconstruction).

In other embodiments a layer of embedded emitters may be used as blocking mask. For example, LEDs (e.g. micro-LED or OLED) can be located in the darker areas and used to illuminate the object. The reflected light passes through the transparent areas and onto the sensor.

The optical device may further comprise a processing unit for receiving and processing output signals from the sensor. The processing unit may be configured to calculate a first derivate with respect to time from the first output signals, calculate a second derivate with respect to time from the second output signals and sum the first derivate and the second derivate to form a summed derivative. The processing unit may be configured to output the summed derivative (the box blurred image) to an external device/unit such as an application of an integrating device. The external device/unit may then use the output to determine the object movement. In other embodiment, the processing unit can be further configured to determine the velocity and/or trajectory of the object based on the summed derivative.

According to a second aspect of the present disclosure there is provided an optical device for optical flow sensing. The device comprises a sensor and a mask structure (10) configured to provide a mask covering the sensor. The mask comprises a single aperture covering between 20% and 90% of the sensor, and wherein the sensor (3) is configured to provide output signals for light transmitted through the mask.

A single aperture that is relatively large, but smaller than the sensor area, is a combination of a mask and its anti-mask. Hence, instead of using two masks to provide the mask and anti-mask as in the first aspect, a single mask that is a combination of the two is used. This can provide a low complexity solution to optical flow sensing. Also, only the sensor signal needs to be acquired and the first derivative taken. Advantageously, no parallax and misalignment occurs. Apart from the mask structure, the optical device of the second aspect may comprise any suitable features comprised by the optical device of the first aspect.

According to a third aspect of the present disclosure there is provided a method of determining a movement of an object (i.e. a method of optical flow sensing). The method may use the optical device according to the first aspect. The method comprises receiving with a sensor light from the object transmitted through a first mask and providing first output signals, and receiving light with the sensor from the object transmitted through a second mask and providing second output signals, wherein the second mask is the anti-mask of the first mask. The method further comprises determining a velocity and/or trajectory of the object from the first and second output signals.

The step of determining may comprise calculating a first derivative of the first output signals, calculating a second derivative of second output signals, and summing the first and second derivatives to provide a summed derivative. Then, determining the velocity and/or trajectory from the summed derivative. For example, the step of determining may comprise training and using artificial intelligence to analyse the summed derivative.

BRIEF DESCRIPTION OF THE PREFERRED EMBODIMENTS

Specific embodiments of the disclosure are described below with reference to the accompanying drawings, wherein FIG. 1 shows a schematic diagram of an integrating device comprising an optical device according to an embodiment;

FIG. 2*a* shows an optical device according to another embodiment comprising a mask structure when providing a first mask;

FIG. 2*b* shows the optical device when the mask structure provides a second, complementary mask;

DETAILED DESCRIPTION

Figure 1:
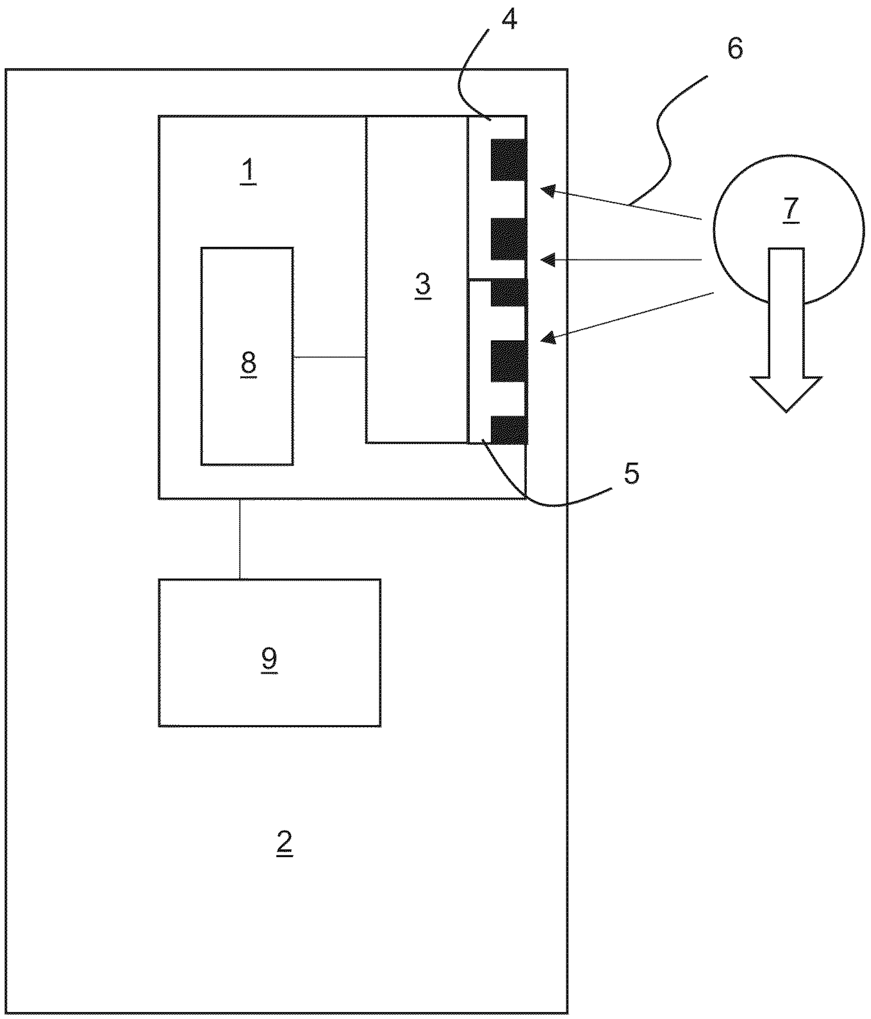

FIG. 1 shows a schematic diagram of an optical device 1 in an integrating device 2 (e.g. a smartphone) according to an embodiment. The device 1 comprises a sensor 3 for sensing incident light. The sensor 3 may comprise an array of photodiodes or other light sensitive elements. The device further comprises a mask structure 10 comprising two optical masks 4 and 5 in front of the sensor 3. The first optical mask 4 is the complementary mask of the second mask 5 (i.e. where the pattern of the first mask 4 is opaque, the pattern of the second mask 5 is transparent and vice versa). Each mask 4 and 5 covers half the sensor 3. Light 6 from a moving object 7 incident on the sensor 3 is transmitted through the optical masks 4 and 5, which modulate the light 8 and project an image onto the sensor 3. The sensor 3 provides first output signals in response to light transmitted through the first optical mask 4 and second output signals in response to light transmitted through the second optical mask 5. A processing unit 8 is configured receive and to process the output signals from the sensor 3. For example, the processing unit 8 may be configured to calculate a summed derivative of the first and second output signals from which the movement (e.g. velocity and/or trajectory) of the object 7 can be determined.

The mask structure 10 may comprise transparent polymers (in the visible range) based on dyes, which block infrared radiation, independently from the incidence angle. The masks 4 and 5 can be lithographically patterned and placed in front of the sensor 3.

The object 7 may be a finger moving in front of a display of the integrating device 2, such as the display of a smartphone or computer tablet into which the optical device 1 is integrated. The optical device 1 is then usable to determine the movement of the object 7 in front of the display, which can be used by an application 9 of the integrating device for e.g. gesture recognition.

Instead of having two spatially separated masks, a single adjustable mask can be used. For example, a liquid crystal display (LCD) might be used to generate dynamic patterns, according to application requirements. The LCD could also generate the direct mask A and subsequently the complementary mask A'. In this way, parallax can be eliminated or reduced, at the price of reducing temporal resolution. Alternatively, transistors e.g. based on vanadium dioxide, can be used to block infrared radiation in a controlled manner while allowing the visible radiation to pass through. The transistors can be organized on flat surfaces to form a grid, which can be modulated to provide a desired mask pattern. This embodiment can provide flexibility in the mask generation. Different types of coded apertures may be generated, and mask-anti-mask pairs may be generated subsequently, with no mask displacement and a dynamic adaptation of the mask related to the application.

Figure 2A:
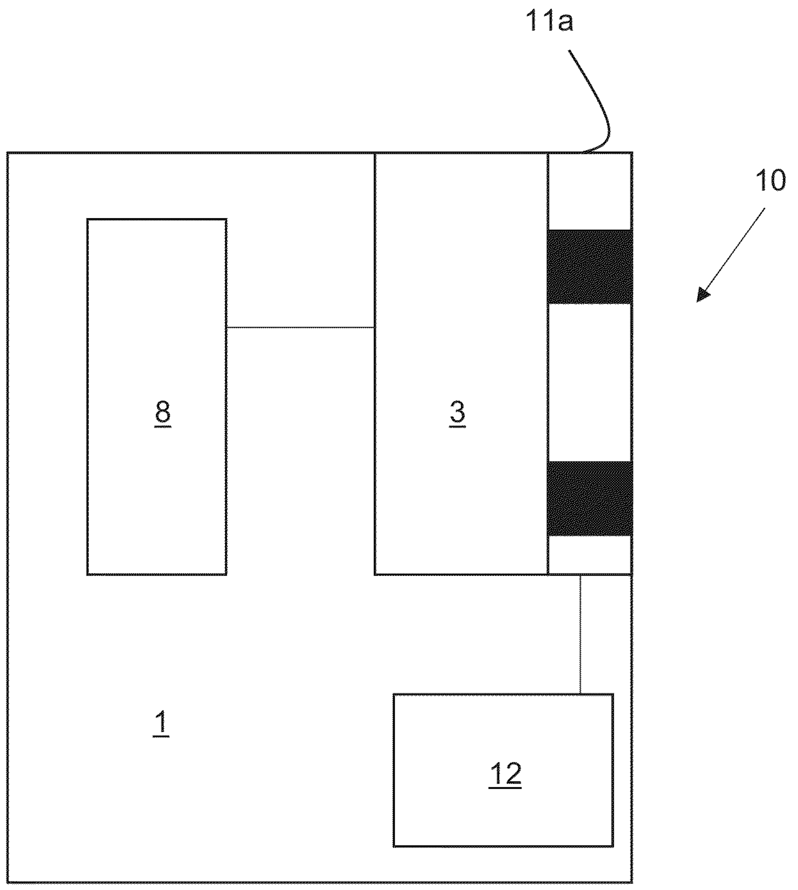
Figure 2B:
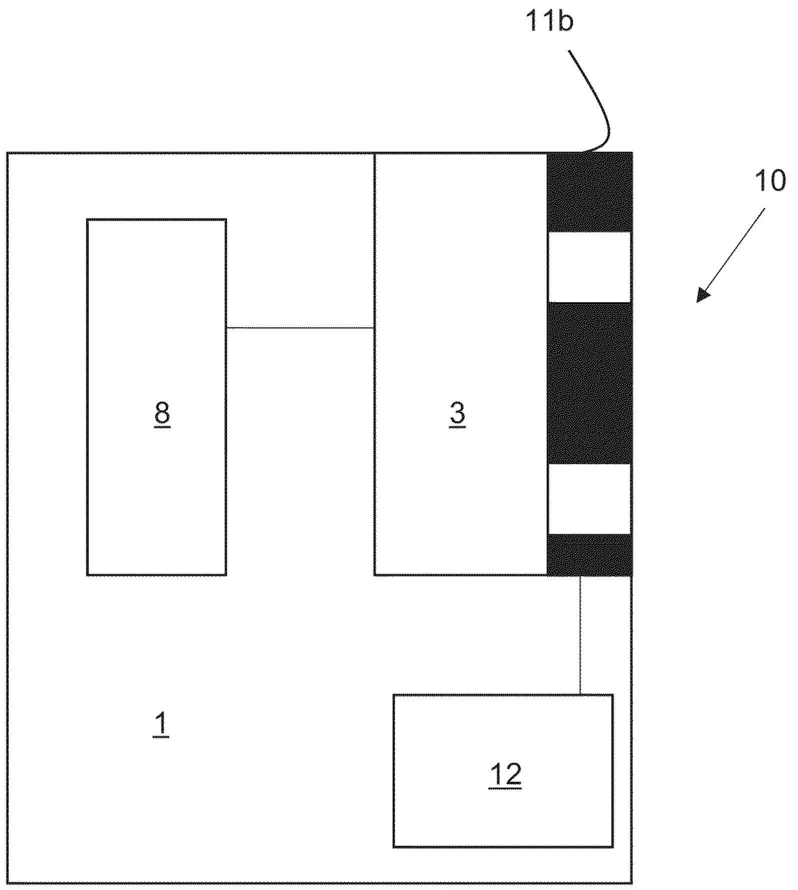

FIGS. 2*a* and 2*b* show schematic diagrams of an optical device 1 according to an embodiment having a mask structure 10 for providing two complementary masks 11*a* and 11*b*, wherein one mask 11*a* is the anti-mask of the other 11*b*. The mask structure 10 comprises a switching unit 12 for switching between the first mask 11*a* and the second mask 11*b*. For example, the mask structure 10 may comprise a liquid crystal display or a transistor array, wherein individual elements of the mask structure can be controlled by the switching unit 12 in order to provide the different masks. The two masks 11*a* and 11*b* are then sampled subsequently in time. The optical device 1 is configured to provide the first mask 11*a* and to receive light with the sensor 3 that is transmitted through the first mask 11*a*. The switching unit is configured to then switch so that the mask structure 10 provides the second mask 11*b*, and the sensor 3 is configured to receive light transmitted through the second mask 11*b*. A processing unit 8 is connected to the sensor 3 for processing output from the sensor 3. The processing unit 8 can be configured to determine the motion of an object in front of the sensor 3 based on the output from the sensor 3.

Figure 3:
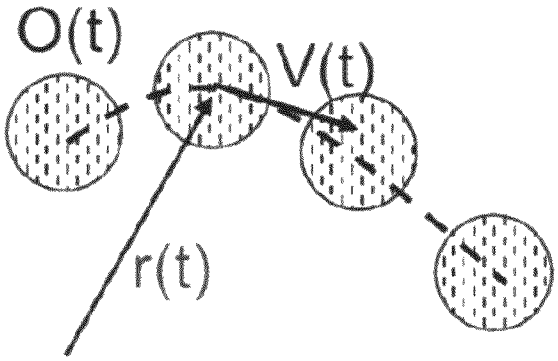
FIG. 3 shows an object with irradiance O(t) and velocity V(t) following a trajectory r(t) relative to a sensor.

FIG. 3 shows the observed irradiance O(t) and velocity V(t) of an object a distance r from an optical system (e.g.

mask and sensor). The imprinted image Ô on the sensor over a time period T ($T=t_2-t_1$) can be expressed by the line integral of the object irradiance along the trajectory r(t):

$$\hat{O}=\int_{r_A}^{r_B} O(r)\cdot dS=\int_{t_1}^{t_2} O(r(t))\cdot|V(t)|dt \tag{1}$$

The optical system comprises a mask structure comprising a mask A and the complementary (anti) mask A'=1−A. If "1" denotes full transmission and "0" radiation blocking, then A' is the inverted version of A.

The image perceived by the sensor in the mask projection associated with mask A is:

$$R=A*\hat{O} \tag{2}$$

where "*" represents the convolution integral.

The image perceived by the sensor in the mask projection associated with the anti-mask A' is:

$$R'=(1-A)*\hat{O} \tag{3}$$

By deriving equations 2 and 3 with respect to time and taking into account the convolution derivation property we get:

$$\frac{dR}{dt}=\frac{dA}{dt}*\hat{O}=\frac{d\hat{O}}{dt}*A \tag{4}$$

$$\frac{dR'}{dt}=\frac{d\hat{O}}{dt}*1-\frac{d\hat{O}}{dt}*A \tag{5}$$

Summing equations 4 and 5 gives:

$$\frac{dR}{dt}+\frac{dR'}{dt}=\frac{d\hat{O}}{dt}*1 \tag{6}$$

As can be seen from equation 8, the dependence on the mask A has been cancelled out. A represents the mask projection on the sensor, and if a source of radiation is moving, then A changes with time. Hence, this can provide another advantage of the proposed solution, since it might not otherwise be possible to neglect the derivative of A with time.

Combining equations 1 and 8 gives:

$$\frac{dR'}{dt}+\frac{dR}{dt}=\frac{d\hat{O}}{dt}*1=\frac{d}{dt}\left(\int_{t_2}^{t_2} O(r(t))\cdot|V(t)|dt\right)\cdot 1=[O(r(t))\cdot|V(t)|]_{t_1}^{t_2}*1 \tag{7}$$

From equation 7 it can be seen that the object velocity V(t) can be retrieved without object reconstruction (which is otherwise required for a lens-less system). The object velocity V(t) is also independent of the mask used, provided that the mask and anti-mask are used as described. Furthermore, the object velocity V(t) depends on the object irradiance, processed by the convolution integral with a matrix ("*1"), which acts as a so called "box blur".

The box blur can be seen as a spatial low pass filter having the kernel composed only by ones. Because "1" appears in equation 3 to convert the ones to zeroes and vice versa, it is a matrix with the same dimensions as the mask A itself.

For applications where the object shape is relatively simple or known a priori, the operation is simplified. For example, in the field of finger movement recognition, the fingertip is known and one can already simulate and expect the typical movement and hence the generated patterns. The border of the box-blurred image depends on the object variation.

Figure 4:
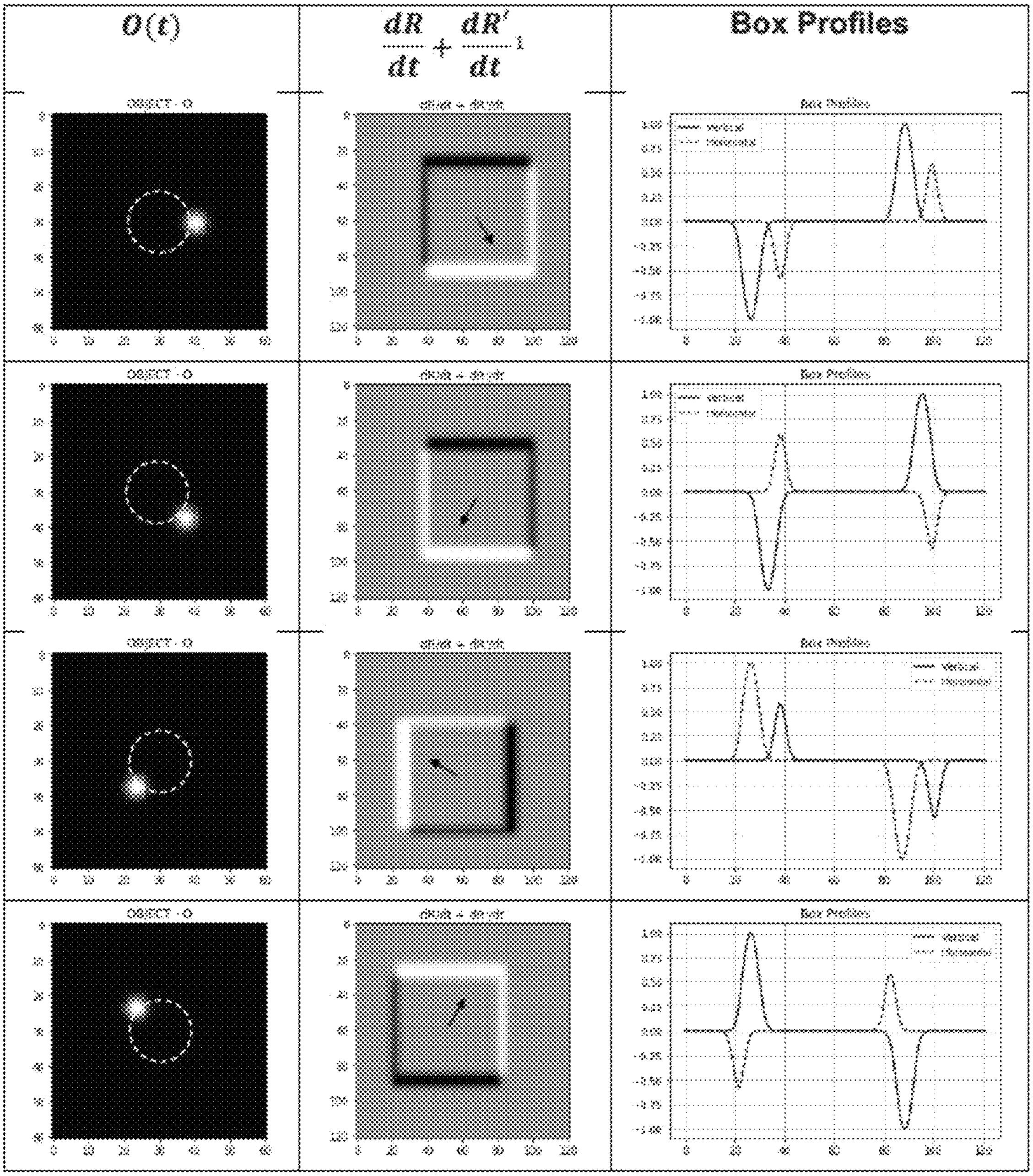
FIG. 4 shows the irradiance, summed derivative, and vertical and horizontal profiles of an object moving in a circle relative to a sensor.

FIG. 4 shows the object irradiance of a Gaussian spot moving a in a circle and the resulting box blurred image and corresponding horizontal and vertical profiles of the box blurred image. The arrow in the box-blurred image indicates the direction of movement. The velocity of the object can be determined from the box blur image, and the trajectory can be determined from a plurality of sequential box blur images. For example, the vertical and horizontal profiles, and in particular the maxima and/or minima of the profiles, can be used to determine the velocity of the object parallel to the sensor plane (in plane motion). The object velocity is proportional to the peak values. The distance between the peaks can be used to determine the center coordinate of the object.

Figure 5:
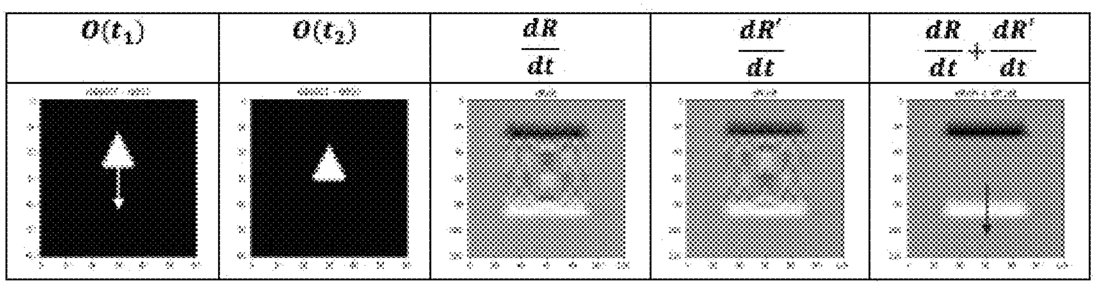
FIG. 5 shows the irradiance, summed derivative, and vertical and horizontal profiles of a triangular object moving parallel to the sensor plane.

FIG. 5 shows the object irradiance at two different times ($t_1$ and $t_2$) and the time derivatives of the projected mask images and their sum. As can be seen, by summing the derivatives, the high frequency information is filtered out and only the low frequency box blur image remains. From the box blur image, the velocity of the object can be determined. For example, since a minimum peak occurs "first" followed by a maximum peak in the vertical profile, the direction of movement of the object is vertically downwards.

Figure 6:
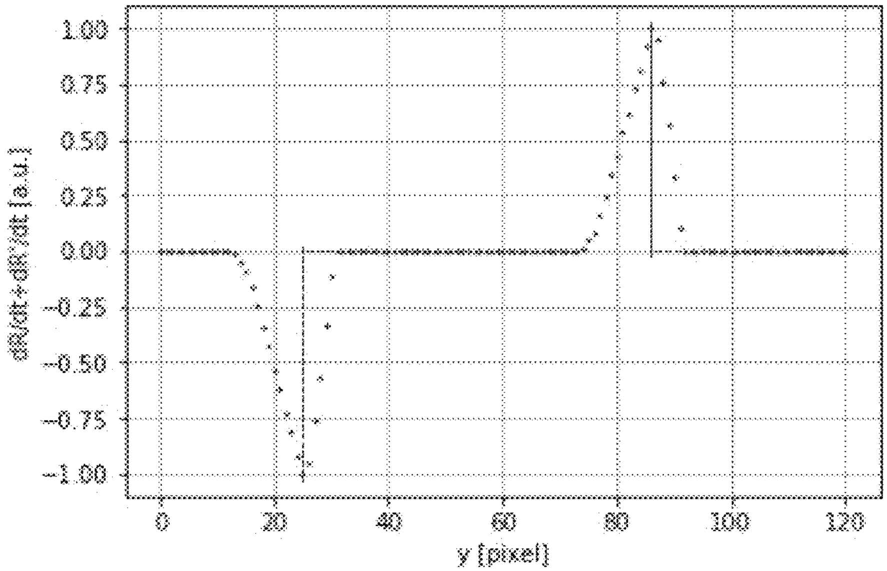
FIG. 6 shows the vertical profile of the summed derivative of the moving object of FIG. 5.

FIG. 6 shows a plot of the normalized vertical profile of the box blur image of FIG. 5. The object (i.e. the triangle) moved five pixels in the vertical direction between time t1 and t2, which is reflected by the gradients of the peaks of the vertical profile.

Figure 7:
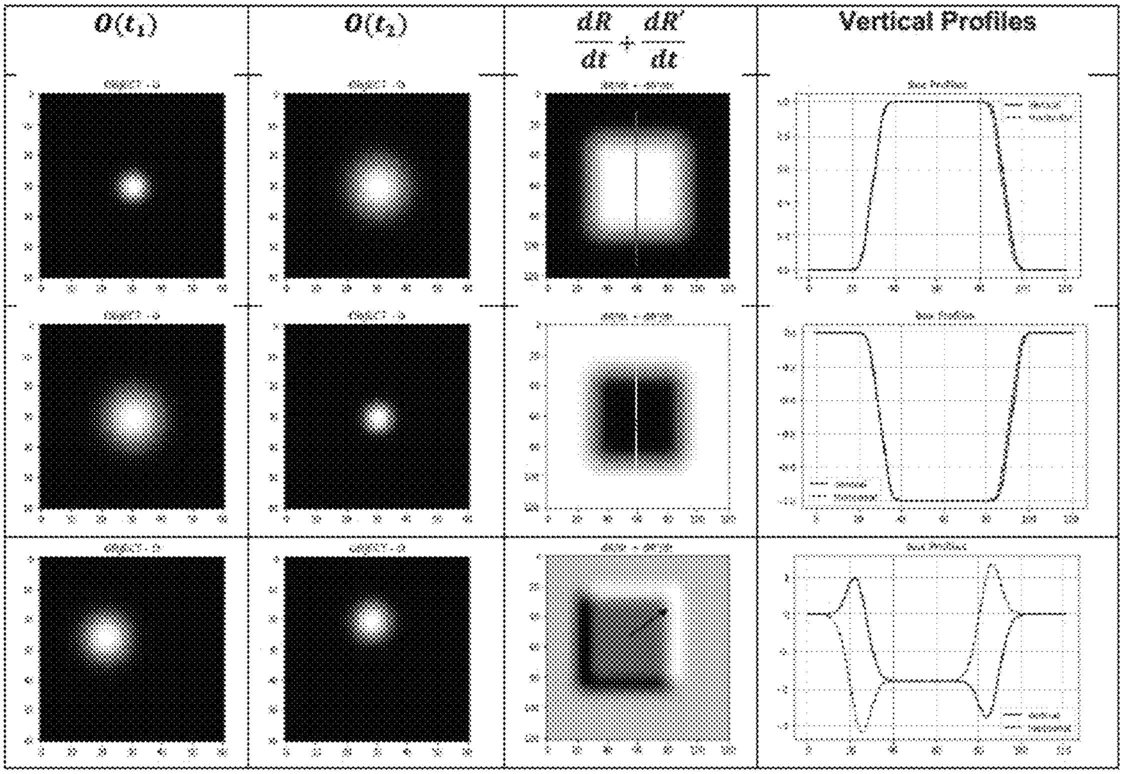
FIG. 7 shows the irradiance, summed derivative, and vertical and horizontal profiles of an object moving perpendicularly to the sensor plane.

FIG. 7 shows the irradiance O(t) of an object moving away from and towards the screen at times $t_1$ and $t_2$ and the resulting box blur images and vertical and horizontal profiles. As can be seen, the vertical (out of plane) movement of the object is also detected by the proposed solution. The first two rows of the Figure depict the situation of an object approaching the sensor and moving away from the sensor respectively (in the z-direction, perpendicular to the sensor plane). The third row depicts the situation when there is movement both along the sensor and perpendicular to the sensor. The level of the horizontal and vertical profiles between the peaks provides information of the velocity perpendicular to the sensor.

Figure 8:
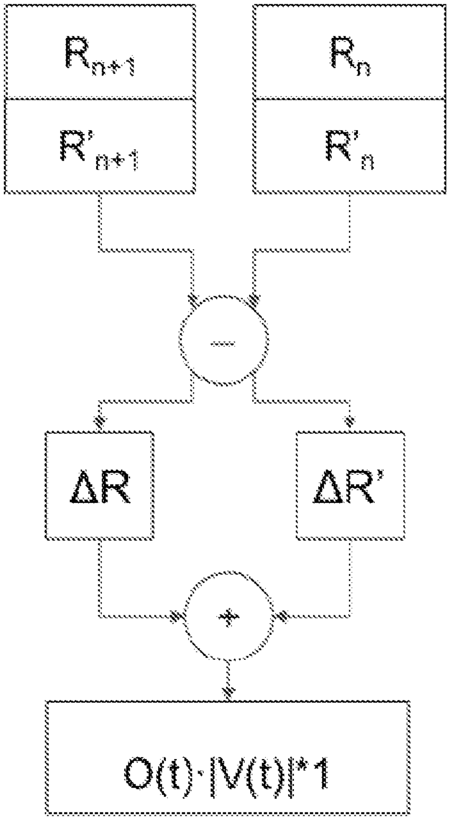
FIG. 8 shows a schematic diagram of an algorithm for optical flow sensing according to an embodiment.

FIG. 8 shows a schematic diagram of an algorithm for implementing an embodiment of flow sensing. The algorithm is based on the finite difference of a sequence of images. The images are organized in sets, which represent the sensor signal readouts associated with the mask and anti-mask. Four sets of image data are obtained $R_n$, $R'_n$, $R_{n+1}$ and $R'_{n+1}$, a first $R_n$ and second $R_{n+1}$ set of image data associated with a first mask, and a third $R'_n$ and fourth $R'_{n+1}$ set of image data associated with a second mask, wherein the second mask is the anti-mask of the first mask. The first set of image data is subtracted form the second set of image data to obtain a first difference of image data ΔR associated with the first mask. Similarly, the third set of image data is subtracted from the fourth set of image data to obtain a second difference of image data ΔR' associated with the second mask. The first and second difference of image data are summed to obtain movement data (O(t)·|V(t)|*1).

Figure 9:
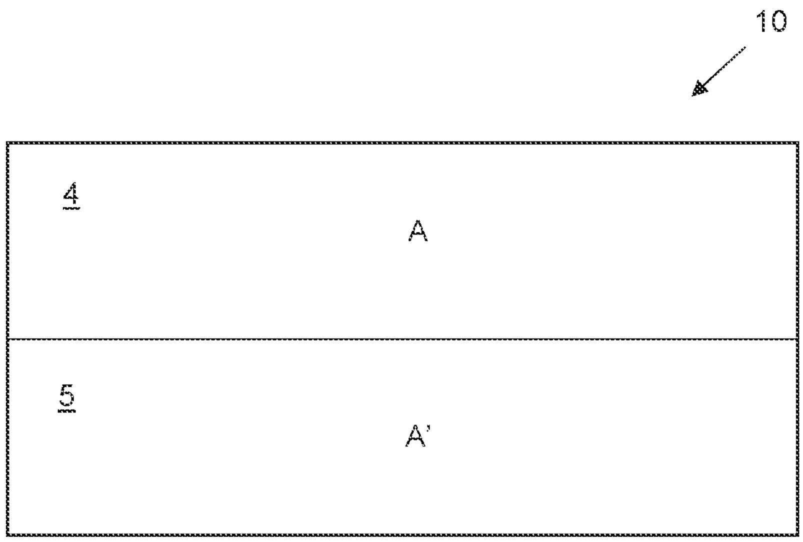
FIG. 9 shows mask structure comprising two masks each covering half the sensor area.

FIG. 9 shows a schematic diagram of an embodiment of the mask structure 10 comprising a first mask 4 and a second mask 5, wherein the second mask 5 is the anti-mask of the first mask 4. The mask structure 10 is split along the shorter dimension. If the active area (the sensor area) is more extended in one direction, there will be less parallax between the mask-anti-mask pair if this split is along the orthogonal direction as shown.

Figure 10:
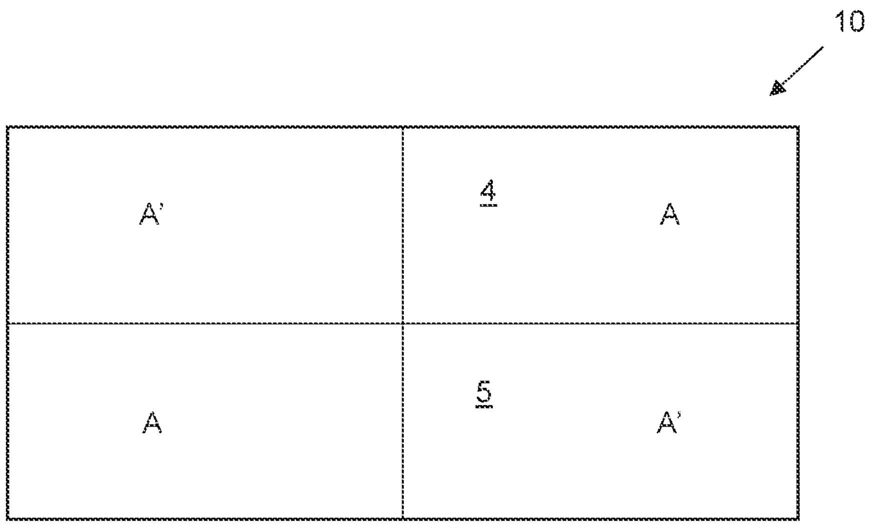
FIG. 10 shows another embodiment of the mask structure wherein the masks are subdivided.

FIG. 10 shows another embodiment of the mask structure 10, wherein the first 4 and second 5 masks are subdivided into smaller regions. This configuration has similar characteristics to the one in FIG. 9, but in this case the other direction can be used as well, because A-A' is the anti-mask of A'-A. Hence, this configuration offers different ways of manipulating the obtained information. For example, the derivatives of parts of the sensor plane may be compared in real time to better asses the object trajectory.

Each mask provided by the mask structure comprises a pattern. Any known pattern can be used with the proposed solution, but some patterns may be particularly suitable for the proposed solution.

Figure 11:
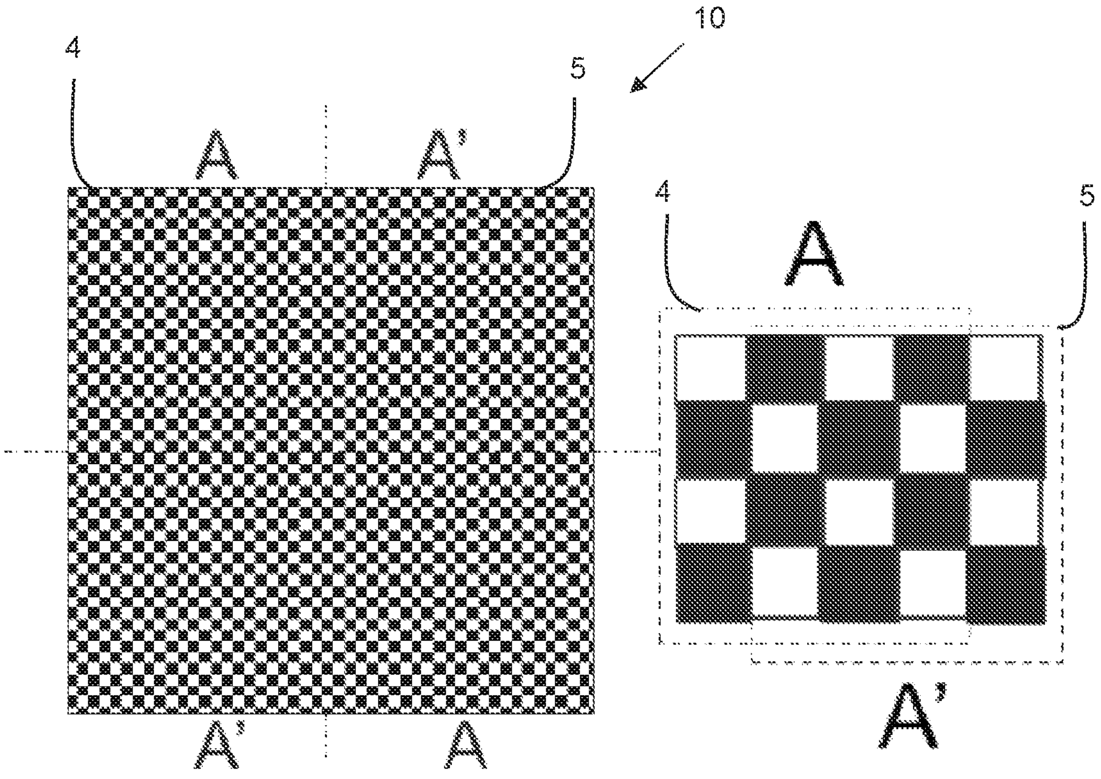
FIG. 11 shows a mask structure comprising a checkerboard mask pattern.

FIG. 11. illustrates a mask structure 10 for providing a mask with a checkerboard pattern. Small areas of the checkerboard can be used as a mask-anti-mask pairs. Therefore, by applying and repeating the technique to selected parts of the sensor, the object trajectory can be reconstructed more precisely, reducing the mask displacement difference. By shifting the mask pattern by a single mask feature (a single square of the checkerboard) in any direction, the resulting mask is the complementary one. By analyzing an area of a checkerboard along with a shifted one, the images from the mask-anti-mask pair is obtained. This can reduce the mask displacement to only a single mask feature, which corresponds to the mask resolution.

Another pattern family, which may be advantageously used, is the uniformly redundant array (URA). These patterns can be advantageous for object reconstruction and achieve a high signal-to-noise ratio (from noise introduced by the mask itself) and are in theory perfect imaging systems. Hence, URAs can have the further benefit providing the double function of reconstructing movement and reconstructing the object. For this type of mask, the complementary mask is also a URA. The matched filter G' (the required filter to obtain the reconstruction) is equal to −G, where G is related to the direct mask A. By having the mask-anti-mask displaced over the sensor area, it is possible to retrieve different object perspectives (3D view, ranging, etc.).

Random patterns can also be used, although they are not perfect imagers. The signal-to-noise ratio depends on the amount of mask features. They are easy to design, not bound to specific prime number as the URAs and any shape can be devised. Moreover, the matched filter is the mask itself (A=G). If the noise introduced by the mask is acceptable, even the object can be reconstructed.

Instead of using two separate masks to provide the mask (A) and anti-mask (A') a single mask that is a combination (A+A') may be used for optical flow sensing. For example, a single large aperture can be used. The aperture (an area of substantially 100% transparency) can be conceptually thought of as a combination of a mask and its anti-mask: $A+(1-A)=1$ The sensor signal is therefore: $R+R'=O*A+O*(1-A)=O*1$ =>Box blurred object The mask structure can thereby provide a simple way of implementing the described box blur technique. In this case, one needs only to acquire the sensor signal and take the first derivative (no parallax or misalignment occurs).

Figure 12:
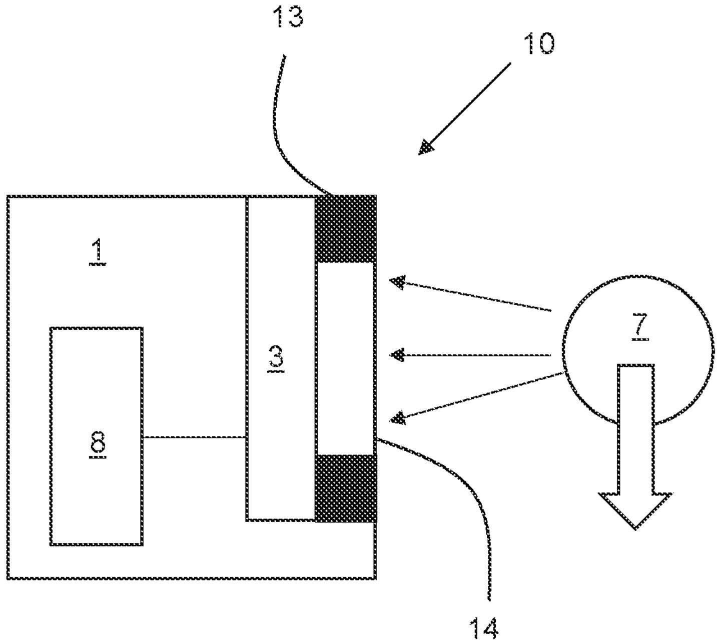
FIG. 12 shows an optical device for optical flow sensing according to another embodiment having mask structure comprising a single large aperture.

FIG. 12 shows a schematic diagram of an optical device 1 for optical flow sensing (but not for image reconstruction) comprising a sensor 3 (e.g. a CMOS image sensor) with a mask structure 10 covering the sensor 3. The mask structure 10 provides a mask 13 having a single large aperture 14. The aperture 14 needs to be smaller than the sensor 3, but may cover, for example, 80% of the of the sensor 3. The optical device 1 further comprises a processor 8 for processing the output from the sensor, in order to determine the motion of the object 7.

Figure 13:
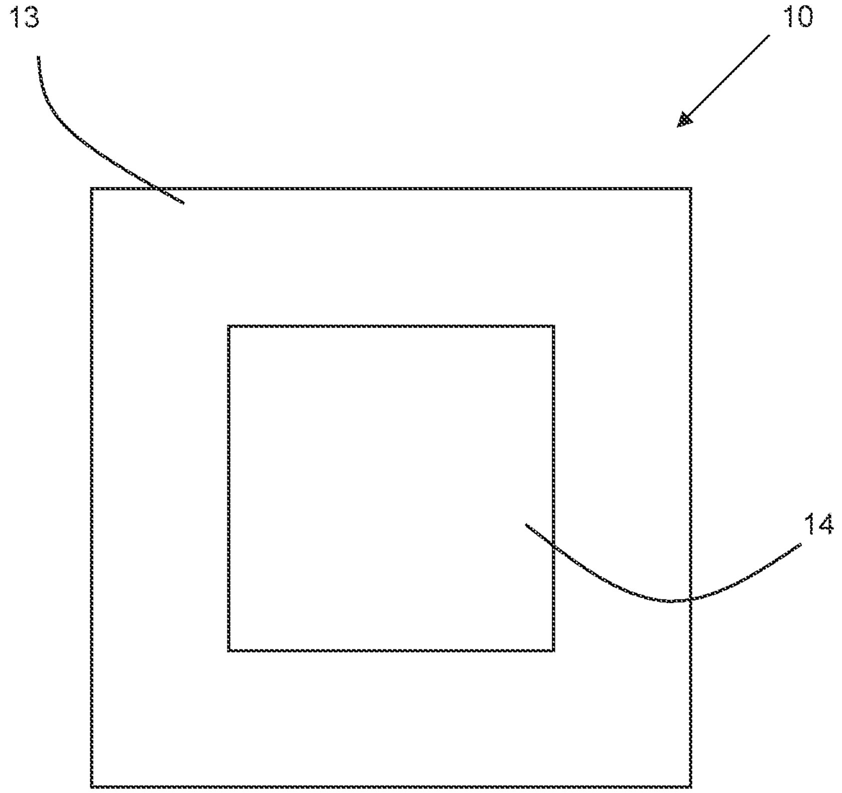
FIG. 13 shows a mask structure having a single large aperture.

FIG. 13 shows a schematic diagram of a front view of the mask structure 10 comprising the single aperture 14.

Although specific embodiments have been described above, the claims are not limited to those embodiments. Each feature disclosed may be incorporated in any of the described embodiments, alone or in an appropriate combination with other features disclosed herein.

| Reference Numerals | |
|---|---|
| 1 | Optical device |
| 2 | Integrating device |
| 3 | Sensor |
| 4 | First mask |
| 5 | Second mask |
| 6 | Light |
| 7 | Object |
| 8 | Processing unit |
| 9 | Application |
| 10 | Mask structure |
| 11a | First mask |
| 11b | Second mask |
| 12 | Switching unit |
| 13 | Mask |
| 14 | Aperture |

The invention claimed is:

1. An optical device comprising:

a sensor;

a mask structure configured to provide a first mask covering at least a part of the sensor and a second mask covering at least a part of the sensor, wherein the second mask is the anti-mask of the first mask, and wherein the sensor is configured to provide first output signals for light transmitted through the first mask and second output signals for light transmitted through the second mask; and at least one processor configured to:

calculate a first derivative with respect to time from the first output signals;

calculate a second derivative with respect to time from the second output signals; and sum the first derivative and the second derivative to form a summed derivative.

2. The optical device according to claim 1, wherein the first mask covers substantially a first half of an area of the sensor and the second mask covers substantially a second half of the area.

3. The optical device according to claim 1, wherein each of the first and second masks is a binary mask.

4. The optical device according to claim 1, wherein the first mask comprises a checkerboard pattern comprising a plurality of squares.

5. The optical device according to claim 4, wherein the second mask comprises the same checkerboard pattern shifted vertically or horizontally by an odd number of squares.

6. The optical device according to claim 1, wherein each of the first and second masks comprises a uniformly redundant array pattern.

7. The optical device according to claim 1, wherein the first mask comprises a random or pseudo-random pattern.

8. The optical device according to claim 1, wherein the first and second masks comprise a patterned polymer layer, which blocks at least light having a wavelength in the range of 900 nm to 1200 nm.

9. The optical device according to claim 1, wherein the mask structure comprises a liquid crystal display (LCD) and the first and second mask are provided by activating or deactivating cells of the LCD, such that the first and second masks are temporally separated.

10. The optical device according to claim 1, wherein the mask structure comprises a layer of transistors.

11. The optical device according to claim 1, wherein the mask structure comprises a layer of emitters.

12. The optical device according to claim 1, wherein the mask structure is reconfigurable in order to change the first and second masks depending on an application of the optical device.

13. The optical device according to claim 1, wherein the at least one processor is further configured to determine a velocity and/or a trajectory of an object based on the summed derivative.

14. A method of determining a movement of an object, the method comprising:

receiving with a sensor light from the object transmitted through a first mask and providing first output signals;

receiving light with the sensor from the object transmitted through a second mask and providing second output signals, wherein the second mask is the anti-mask of the first mask; and determining a velocity and/or trajectory of the object from the first and second output signals by:

calculating a first derivative with respect to time from the first output signals;

calculating a second derivative with respect to time from the second output signals;

summing the first derivative and the second derivative to form a summed derivative; and determining the velocity and/or trajectory from the summed derivative.

15. The method according to claim 14, wherein the step of determining comprises training and using artificial intelligence to analyse the summed derivative.

* * * * *